United States Patent
Bennett et al.

[11] Patent Number: 5,293,501
[45] Date of Patent: Mar. 8, 1994

[54] METHOD AND APPARATUS FOR INSTALLING/DRESSING A WIRING HARNESS

[75] Inventors: Kelvin J. Bennett, Tipton; Mark E. DeMott, Ypsilanti, both of Mich.

[73] Assignee: Ford Motor Company, Dearborn, Mich.

[21] Appl. No.: 756,012

[22] Filed: Sep. 6, 1991

Related U.S. Application Data

[62] Division of Ser. No. 474,980, Feb. 5, 1990, Pat. No. 5,064,970.

[51] Int. Cl.$^5$ .............................................. H05K 1/00
[52] U.S. Cl. .................................... 174/135; 29/235; 138/128
[58] Field of Search .................. 174/135; 29/235; 112/262.2, 438; 138/128; 428/36.1

[56] References Cited

U.S. PATENT DOCUMENTS

| | | | |
|---|---|---|---|
| 616,695 | 12/1898 | Bosley | 112/438 X |
| 681,470 | 8/1901 | Wolff | 138/128 X |
| 3,542,021 | 11/1970 | Preston | 128/157 |
| 4,653,799 | 3/1987 | Arai et al. | 296/146 |
| 4,750,265 | 6/1988 | Watanabe et al. | 29/854 |
| 4,800,648 | 1/1989 | Nakayama et al. | 29/854 |
| 4,815,984 | 3/1989 | Sugiyama et al. | 439/211 |
| 4,824,164 | 4/1989 | Nakayama et al. | 296/146 |
| 4,891,256 | 1/1990 | Kite et al. | |
| 4,944,685 | 7/1990 | Schulte | 439/135 |
| 4,987,724 | 1/1991 | Rutherford | 29/235 X |
| 5,016,859 | 5/1991 | Zimmer et al. | 174/135 X |

FOREIGN PATENT DOCUMENTS

| | | | |
|---|---|---|---|
| 711499 | 7/1954 | United Kingdom | 29/235 |
| 1024973 | 4/1966 | United Kingdom | 112/262.2 |

OTHER PUBLICATIONS

Photograph of a wire containment hose.

Primary Examiner—Leo P. Picard
Assistant Examiner—Cheryl R. Figlin
Attorney, Agent, or Firm—Roger L. May; Damian Porcari

[57] ABSTRACT

A wiring harness is enshrouded in a tubular length of stretchable material. The shroud holds pigtails, take-outs, connectors, harness hold-downs and the like which otherwise extend from the harness against a trunk of the harness so that it can be inserted through an opening in a firewall or other structural member of a motor vehicle or other product for installation of the harness. Once inserted through the opening, the shroud is removed, preferably by means of a closure device which initially maintains the shroud as a tubular structure but can be removed to open at least a portion of the tubular structure to facilitate shroud removal. To facilitate installation of the shroud onto a wiring harness, the shroud is initially stretched over a tubular applicator to expand the shroud. A wiring harness is then inserted into the tubular applicator and the shroud is peeled off the tubular applicator onto the wiring harness as the harness is passed through and beyond the applicator to apply the tubular shroud to the harness.

10 Claims, 2 Drawing Sheets

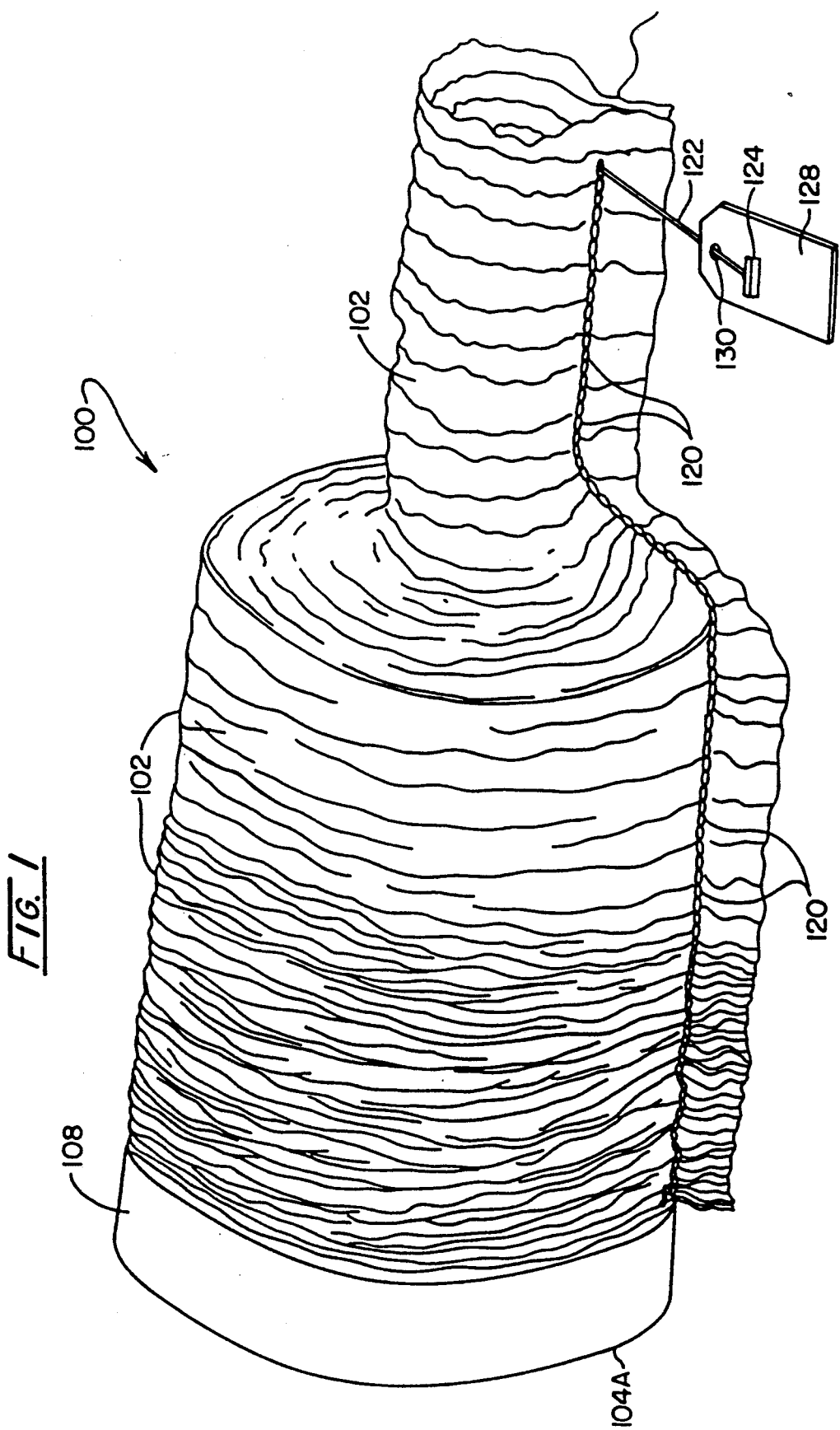

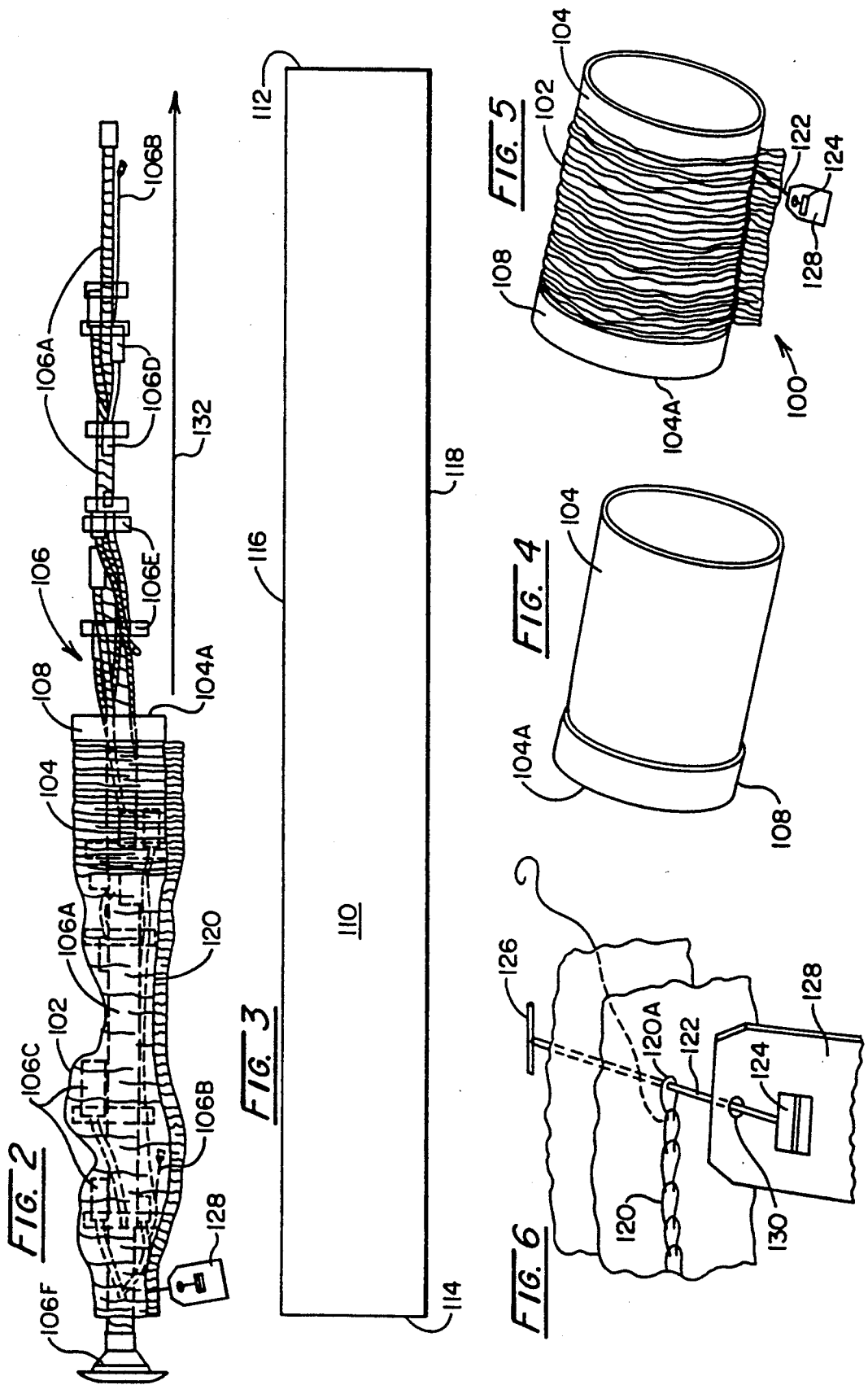

METHOD AND APPARATUS FOR INSTALLING/DRESSING A WIRING HARNESS

This is a division of application Ser. No. 07/474,980 filed Feb. 5, 1990, now U.S. Pat. No. 5,064,970.

BACKGROUND OF THE INVENTION

The present invention relates generally to the installation of a wiring harness used for interconnecting electrical equipment and/or circuits and, more particularly, to a method and apparatus for dressing or enshrouding such a wiring harness for installation of the harness through an opening of a structural member during manufacture of a product including the structural member. The present invention is particularly applicable to the manufacture of motor vehicles and accordingly will be described with reference to that application.

Wiring harnesses used for motor vehicle electrical circuits are normally preformed as a central bundle of electrical conductors. Projecting from the bundle at varying locations along its length are pigtails, takeouts, connectors, harness hold-downs and the like which may be referred to herein as extensions. The extensions serve to make connections from electrical circuits or equipment to or through the electrical conductors of the wiring harness to associated electrical circuits or equipment or to hold the harness in place in the motor vehicle. Oftentimes, preformed wiring harnesses must be routed through openings in structural members, for example through the firewall of a motor vehicle, to make the required connections. When a wiring harness is to be passed through an opening, the extensions tend to catch on the opening and interfere with quick and easy installation of the harness.

Prior to this time, extensions from a wiring harness typically have been taped against the central bundle or trunk of the wiring harness to facilitate installation. Unfortunately, the application of tape to the individual extensions is a time consuming operation.

An alternate wiring harness dressing arrangement involves the use of tubular "heat shrink" material. The extensions from the wiring harness are held against the harness trunk and a length of tubular heat shrink material is slid over the harness. Heat is then applied to the heat shrink material causing it to shrink or reduce in size and trap the extensions down to substantially the size of the wiring harness trunk. The dressed wiring harness is then inserted through an opening in a motor vehicle firewall or other structural element. Once fully inserted, the shrink wrap material is ripped from the wiring harness to release the extensions for the remainder of the installation of the wiring harness.

Unfortunately, the application of heat shrink material to wiring harnesses requires substantial floor space, the application process is difficult to control, the application requires at least as much labor as taping and the heat shrink material is more expensive than tape. Further, there have been problems in removing the heat shrink material. Perforations have been formed in the heat shrink material to attempt to overcome the removal problem. However, even if perforations are provided, problems may persist since excessive heat can bond the perforated sections together. Of course, there is also the possibility that excesive heat will damage the wiring harnesses.

Accordingly, there is a need for an improved method and apparatus for dressing wiring harnesses for installation through openings in firewalls or other structural elements of motor vehicles and other products.

Preferably the improved wiring harness installation/dressing method and apparatus would utilize inexpensive materials, be readily applied to and removed from wiring harnesses, and permit recycling or reuse of at least some of the apparatus to further reduce the expenses involved in wiring harness installation operations.

SUMMARY OF THE INVENTION

This need is met by the method and apparatus of the present invention wherein a wiring harness is enshrouded in a tubular length of preferably stretchable material. The shroud holds the pigtails, takeouts, connectors, harness hold-downs and the like which otherwise extend from the harness against the trunk of the harness. Thus dressed or enshrouded, the wiring harness can be extended through an opening in a firewall or other structural member of a motor vehicle or other product for installation of the harness. Once inserted through the opening, the shroud is removed, preferably by means of a closure device which initially maintains the shroud as a tubular structure but can be removed to open at least a portion of the tubular structure to facilitate shroud removal. As noted, the shroud is preferably made of a "stretchable material" which is intended to include without limitation stretchable cloth, elasticized cloth, a rubber product, cloth interwoven with elastic thread or other appropriately stretchable or stretchably reinforced material. To facilitate installation of the shroud onto a wiring harness, the shroud is initially stretched over a tubular applicator to expand the shroud. A wiring harness is then inserted into the tubular applicator and the shroud is slid off the tubular applicator onto the wiring harness as the harness is passed through and beyond the applicator to apply the tubular shroud to the harness. The applicator is then returned for reuse.

In accordance with one aspect of the present invention, a wiring harness shroud comprises a tubular section of stretchable material for enshrouding a wiring harness to be inserted through an opening of a structural member during a manufacturing operation for producing a product including the structural member. The tubular section of stretchable material has two ends, at least one of which is open to receive the wiring harness. Preferably, the tubular section of stretchable material comprises closure means extending along at least a portion thereof for releasably closing the tubular section of stretchable material. The closure means are operable after installation of a dressed wiring harness to open the shroud and thereby rapidly remove it from the harness.

The stretchable material for example may comprise cloth. In the presently preferred embodiment of the invention, the tubular section of stretchable material comprises a generally rectangular piece of cloth having two opposed short sides and two opposed long sides. The long sides of the piece of cloth are joined to one another by the closure means which comprises a single thread chain stitch and tab means for securing the chain stitch at one end of the tubular means. The tab means is forcibly removed from the shroud to open the tubular section of stretchable material by freeing or releasing the chain stitch. The tubular section of stretchable material may comprise cloth made of a two-way stretch blend including spandex.

In accordance with another aspect of the present invention, a wiring harness shroud comprises tubular means for enshrouding a wiring harness to be inserted through an opening of a structural member during a manufacturing operation for producing a product including the structural member. The tubular means is closed by closure means extending along at least a portion thereof for releasably closing the tubular means. The closure means is operated after insertion of the shrouded wiring harness through an opening to at least partially open the tubular means and thereby permit rapid removal of the tubular means from the wiring harness.

The tubular means may comprise a generally rectangular piece of cloth having two opposed short sides and two opposed long sides. The long sides of the piece of cloth are joined to one another by the closure means which preferably comprises a single thread chain stitch and tab means for securing the chain stitch at one end of the tubular means. The tab means is forcibly removed from the shroud to open the tubular means by freeing or releasing the chain stitch. The cloth forming the tubular means is preferably stretchable and may comprise a two-way stretch blend including spandex.

In accordance with a further aspect of the present invention, a wiring harness shroud assembly for use in enshrouding a wiring harness prior to insertion through an opening of a structural member during a manufacturing operation for producing a product including the structural member comprises tubular shroud means formed of stretchable material for enshrouding a wiring harness. Closure means extend along at least a portion of the tubular shroud means for releasably closing the tubular shroud means. The closure means are opened to rapidly remove the tubular shroud means from the installed harness. The assembly is completed by tubular applicator means which are positioned within the tubular shroud means for expanding the tubular shroud means to facilitate application of the tubular shroud means to a wiring harness.

In accordance with yet another aspect of the present invention, a method for inserting a wiring harness including extensions projecting therealong through an opening of a structural member during a manufacturing operation for producing a product including the structural member comprises the steps of: forming a tubular shroud member of a stretchable material; applying the tubular shroud member to the wiring harness to enshroud and thereby contain the extensions within the tubular shroud member; passing the enshrouded wiring harness through an opening; and, removing the tubular shroud member after the wiring harness has been passed through the opening.

The step of applying the tubular shroud member to the wiring harness comprises the steps of: positioning a tubular applicator within the tubular shroud member for expanding the tubular shroud member; and, advancing the tubular applicator and the wiring harness relative to one another to thereby transfer the tubular shroud member from the tubular applicator to the wiring harness.

The step of removing the tubular shroud member after the wiring harness has been extended through the opening preferably comprises the steps of: extending closure means along at least a portion of the tubular shroud member for releasably closing the tubular shroud member; and, operating the closure means to rapidly open the tubular shroud member. In the presently preferred embodiment of the invention, the step of extending closure means along at least a portion of the tubular shroud member comprises the steps of: sewing the tubular shroud member with a single thread chain stitch; and, providing tab means for securing the chain stitch at one end of the tubular shroud member. For this embodiment, the step of opening the closure means to rapidly remove the tubular shroud member comprises forcibly removing the tab means to open the tubular shroud member by freeing or releasing the chain stitch.

In accordance with still another aspect of the present invention, a method for enshrouding a wiring harness within a tubular shroud member to contain loose extensions projecting along the wiring harness such that the wiring harness can be inserted through an opening of a structural member during a manufacturing operation for producing a product including the structural member comprises the steps of: forming a tubular shroud member of a stretchable material; positioning a tubular applicator within the tubular shroud member for expanding the tubular shroud member; and, applying the tubular shroud member to the wiring harness by advancing the tubular applicator over the wiring harness and transferring the tubular shroud member from the tubular applicator to the wiring harness.

The step of forming a tubular shroud member of a stretchable material preferably comprises the steps of: forming a generally rectangular piece of stretchable material having two opposed short sides and two opposed long sides; and, extending closure means along the two opposed long sides to releasably close the tubular shroud member. The step of extending closure means along the two opposed long sides to releasably close the tubular shroud member is preferably performed by the steps of: sewing the two opposed long sides to one another with a single thread chain stitch; and, providing tab means for securing the chain stitch at one end of the tubular shroud member.

Other features and advantages of the invention will be apparent from the following description, the accompanying drawings and the appended claims.

BRIEF DESCRIPTION OF THE DRAWINGS

FIG. 1 is a perspective view of a wiring harness shroud assembly in accordance with the present invention showing a shroud partially removed from a tubular applicator;

FIG. 2 is a plan view showing application of the shroud of FIG. 1 to a wiring harness;

FIG. 3 is a rectangular piece of stretchable cloth from which the shroud of FIG. 1 is preferably made;

FIG. 4 is a perspective view of a tubular applicator forming a part of the wiring harness shroud assembly of FIG. 1 and used to apply the shroud as shown in FIG. 2;

FIG. 5 shows a wiring harness shroud assembly ready for application of the shroud to a wiring harness; and, FIG. 6 is a perspective view on an expanded scale of the preferred shroud closure means or single thread chain stitch and tab means for removing the closure means after a shrouded or dressed wiring harness has been installed.

DETAILED DESCRIPTION OF THE INVENTION

While the present invention was conceived and is being utilized in the automotive industry for the manufacture of motor vehicles, it will be appreciated that it is generally applicable to the installation of a wiring harness into any product including a wiring harness which must extend through an opening in a structural member of the product. Accordingly, the invention is directed to a method and apparatus for dressing or enshrouding a wiring harness to restrain pigtails, takeouts, connectors, harness hold-downs and the like, which may be referred to herein as extensions, for installation of the wiring harness.

Reference will now be made to the drawing figures wherein a wiring harness shroud assembly 100 in accordance with the present invention is shown in perspective in FIGS. 1 and 5. In FIG. 5, tubular shroud means comprising a shroud 102 formed of stretchable material is fully expanded and supported upon tubular applicator means while the shroud 102 is shown as being partially removed from the applicator means in FIG. 1. The tubular applicator means preferably comprises an applicator tube 104 of a first diameter which is sized to receive and stretch or expand the shroud 102 for application to a wiring harness 106. A collar 108 surrounds and is secured to the application end 104A of the tube 104, i.e. the end of the applicator tube 104 which is moved along the wiring harness 106 to peel the shroud 102 from the tube 104 and apply it to the harness 106.

The wiring harness 106, which can be used for electrical circuits of a motor vehicle or for other applications, is preformed as a central trunk or bundle 106A of electrical conductors. Projecting from the bundle 106A at varying locations along its length are pigtails 106B, takeouts 106C, connectors 106D, harness hold-downs 106E and the like which are collectively referred to herein as extensions. The extensions serve to make connections from electrical circuits or equipment to or through the electrical conductors of the wiring harness 106 to associated electrical circuits or equipment or to hold the harness 106 in place. In the illustrated embodiment, the wiring harness 106 is terminated by a grommet 106F which serves to seal the opening through which the harness 106 is inserted.

The tube 104 and collar 108 are preferably formed of a stiff cardboard material for a low cost structure yet one which can be repeatedly used for a substantial number of shroud applications; however, a variety of materials can be used. For example, the tube 104 and collar 108 can be constructed of plastic, fiber glass, or other appropriate material. The collar 108 serves as a convenient hand-hold for application of the shroud 102 and also defines the limits of the applicator tube 104 for initial installation of the shroud 102 to the tube 104 prior to application of the shroud 102 to the wiring harness 106. The shroud 102 is preferably formed of a stretchable material such as a two-way stretch blend cloth including spandex, a rubber or rubberized material, material reinforced by elastic thread or the like. However, for some applications, stretchable material may not be utilized.

As shown in FIG. 3, an elongated generally rectangular piece of cloth 110 having two opposed short sides 112, 114 and two opposed long sides 116, 118 is used to form the shroud 102. The long sides 116, 118 of the piece of cloth 110 are joined to one another by closure means to define the tubular shroud 102. The closure means preferably comprises a single thread chain stitch 120 best shown in FIGS. 1 and 6, and tab means for securing the chain stitch 120 at one end of the shroud 102. While removable closure means is shown as extending substantially the entire length of the shroud 102 in the illustrated embodiments, in some applications the shroud 102 may include removable closure means only along a portion of its length. The tab means is forcibly removed to open the shroud 102 by freeing or releasing the chain stitch 120. Typically, the chain stitch 120 will then unravel.

In the presently preferred embodiment, the tab means comprises a polymeric shaft 122 having an integral tab 124 at one end and an integral terminating bar 126 at the other end. A removal tag 128 includes an aperture 130 through which the shaft 122 extends. The tag 128 can be formed of cardboard, polymeric, or other appropriate material as preferred for a given application. The tab means as illustrated is essentially the same as the ubiquitous price tags which are inserted through material of clothing or other items constructed of easily penetrable material such as cloth. For this application, the shaft 122 of the tab means is inserted through one of the last stitches 120A of the single thread chain stitch 120 where it helps to perform the closure operation for the shroud 102 by stabilizing the chain stitch 120 and preventing its unraveling.

Thus, the tab means serves to hold the chain stitch 120 together during installation of the shroud 102 to the applicator tube 104, application of the shroud 102 to the wiring harness 106 and installation of the wiring harness 106 through an opening (not shown) in a structural member of a product being manufactured. Once the wiring harness 106 has been dressed or enshrouded and installed, the shroud 102 is opened by grasping the tag 128 and forcibly removing it to open the shroud 102 by releasing the chain stitch 120. The opened shroud 102 is then removed and may be discarded or retained for reuse as desired.

While the chain stitch 120 is presently preferred for the shroud 102 of the invention, it should be appreciated that other closure means are contemplated. For example, a hook and loop material sold under the name Velcro which is a registered trademark of Velcro USA Inc. could be used, a polymeric tongue and groove fastener such as used on food storage bags and the like could be used and other closure structures will be suggested to those skilled in the art. For some applications of the present invention, it is contemplated that closure means may not be required at all. For example, in some applications it is contemplated that wiring harnesses to be enshrouded or dressed would include extensions which would not catch on a permanently closed shroud.

The present invention also encompasses a method for inserting the wiring harness 106 including loose connectors, pigtails and other extensions (106B-106E) therealong through an opening of a structural member during a manufacturing operation for producing a product including the structural member. The method of the present invention comprises the steps of: enshrouding the wiring harness 106 within the tubular shroud 102 to contain the connectors, pigtails and other extensions (106B-106E) within the tubular shroud 102; passing the enshrouded wiring harness 106 through an opening; and, removing the tubular shroud 102 after the wiring harness 106 has been passed through the opening.

A method of enshrouding the wiring harness 106 within the tubular shroud 102 preferably comprises the steps of: forming the tubular shroud 102 of a stretchable material; positioning the tubular applicator 104 within the tubular shroud 102 for expanding the tubular shroud 102; and, applying the tubular shroud 102 to the wiring harness 106 by advancing the tubular applicator 104 over the wiring harness 106 and transferring the tubular shroud 102 from the tubular applicator 104 to the wiring harness 106. These steps of the method of the present invention are best illustrated in FIG. 2 wherein the shroud 102 is being applied to the wiring harness 106 by moving the applicator tube 104 to the right as shown by the arrow 132 relative to the wiring harness 106 while the shroud 102 is slid off the applicator tube 104 onto the wiring harness 106. Of course, the shroud 102 can be applied by moving the applicator tube 104 and the wiring harness 106 relative to one another. Accordingly, the shroud 102 can be applied by pulling the wiring harness through the applicator tube 104 or by mutual movement of the two.

The step of removing the tubular shroud 102 after the wiring harness 106 has been extended through an opening comprises the steps of: extending closure means along at least a portion of the tubular shroud 102 for releasably closing the tubular shroud 102; and, operating the closure means to rapidly open the tubular shroud 102. The step of extending closure means along at least a portion of the tubular shroud 102 preferably comprises the steps of: sewing the tubular shroud 102 with the single thread chain stitch 120; and, providing tab means for securing the chain stitch 120 at one end of the tubular shroud 102. The step of operating the closure means to rapidly open the tubular shroud 102 then comprises forcibly removing the tab means to open the tubular shroud 102 by freeing the chain stitch 120.

Having thus described the method and apparatus for dressing a wiring harness of the present invention in detail and by reference to preferred embodiments thereof, it will be apparent that modifications and variations are possible without departing from the scope of the invention defined in the appended claims.

What is claimed is:

1. A method for inserting a wiring harness including loose extensions projecting therealong through an opening of a structural member during a manufacturing operation for producing a product including the structural member comprising the steps of:
   forming a tubular shroud member of a stretchable material;
   applying said tubular shroud member to the wiring harness to enshroud and thereby contain the extensions within said tubular shroud member;
   passing the enshrouded wiring harness through said opening; and
   removing the tubular shroud member after the wiring harness has been passed through said opening.

2. A method for inserting a wiring harness including loose extensions projecting therealong through an opening of a structural member as claimed in claim 1 wherein the step of applying said tubular shroud member to the wiring harness comprises the steps of:
   positioning a tubular applicator within said tubular shroud member for expanding said tubular shroud member; and
   advancing said tubular applicator and the wiring harness relative to one another to thereby transfer said tubular shroud member from said tubular applicator to the wiring harness.

3. A method for inserting a wiring harness including loose extensions projecting therealong through an opening of a structural member as claimed in claim 2 wherein said stretchable material comprises cloth.

4. A method for inserting a wiring harness including loose extensions projecting therealong through an opening of a structural member as claimed in claim 3 wherein said stretchable cloth material comprises a two-way stretch blend including spandex.

5. A method for inserting a wiring harness including loose extensions projecting therealong through an opening of a structural member as claimed in claim 1 wherein the step of removing the tubular shroud member after the wiring harness has been passed through the opening comprises the steps of:
   extending closure means along at least a portion of a length of said tubular shroud member for releasably closing said length of said tubular shroud member; and
   operating said closure means to rapidly open said length of said tubular shroud member.

6. A method for inserting a wiring harness including loose extensions projecting therealong through an opening of a structural member as claimed in claim 5 wherein the step of extending closure means along at least a portion of a length of said tubular shroud member comprises the steps of:
   sewing said at least a portion of said length of said tubular shroud member with a single thread chain stitch; and
   providing tab means for securing said chain stitch at one end of said tubular shroud member.

7. A method for inserting a wiring harness including loose extensions projecting therealong through an opening of a structural member as claimed in claim 6 wherein the step of operating said closure means to rapidly open said tubular shroud member comprises forcibly removing said tab means to open said tubular shroud member by releasing said chain stitch.

8. A method for enshrouding a wiring harness within a tubular shroud member to contain loose extensions projecting along said wiring harness such that said wiring harness can be inserted through an opening of a structural member during a manufacturing operation for producing a product including the structural member, said method comprising the steps of:
   forming a tubular shroud member of a stretchable material;
   positioning a tubular applicator within said tubular shroud member for expanding said tubular shroud member; and
   applying said tubular shroud member to the wiring harness by advancing said tubular applicator over the wiring harness and transferring said tubular shroud member from said tubular applicator to the wiring harness.

9. A method for enshrouding a wiring harness within a tubular shroud member as claimed in claim 8 wherein the step of forming a tubular shroud member of a stretchable material comprises the steps of:
   forming a generally rectangular piece of stretchable material having two opposed short sides and two opposed long sides; and
   extending closure means along said two opposed long sides to releasably close said tubular shroud member.

10. A method for enshrouding a wiring harness within a tubular shroud member as claimed in claim 9 wherein the step of extending closure means along said two opposed long sides to releasably close said tubular shroud member comprises the steps of:
   sewing said two opposed long sides to one another with a single thread chain stitch; and
   providing tab means for securing said chain stitch at one end of said tubular shroud member.

* * * * *